(12) United States Patent
Frait et al.

(10) Patent No.: US 9,145,966 B2
(45) Date of Patent: Sep. 29, 2015

(54) HYDRAULIC PUMP CONFIGURATION FOR AUTOMATIC TRANSMISSION

(71) Applicant: FORD GLOBAL TECHNOLOGIES, LLC, Dearborn, MI (US)

(72) Inventors: Steven A. Frait, Milan, MI (US); Larry A. Deutsch, Farmington Hills, MI (US); Jeffrey E. Maurer, Commerce, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 463 days.

(21) Appl. No.: 13/653,442

(22) Filed: Oct. 17, 2012

(65) Prior Publication Data

US 2014/0105728 A1    Apr. 17, 2014

(51) Int. Cl.
*F16H 57/04* (2010.01)
*F16H 3/66* (2006.01)
*F16H 3/44* (2006.01)

(52) U.S. Cl.
CPC .............. *F16H 57/0441* (2013.01); *F16H 3/66* (2013.01); *F16H 57/0484* (2013.01); *F16H 2003/447* (2013.01); *F16H 2200/2012* (2013.01); *F16H 2200/2046* (2013.01)

(58) Field of Classification Search
CPC ..................................................... F16H 57/0441
USPC ........................................................ 415/122.1
See application file for complete search history.

(56) References Cited

U.S. PATENT DOCUMENTS

| 4,640,153 | A  | * | 2/1987 | Brogdon et al. ................. 475/31 |
| 5,310,310 | A  | * | 5/1994 | Nakatsukasa et al. ...... 415/214.1 |
| 2008/0110714 | A1 | * | 5/2008 | Schultz ......................... 192/3.25 |
| 2012/0082570 | A1 | * | 4/2012 | Schultz ........................... 417/212 |
| 2012/0122624 | A1 | * | 5/2012 | Hawkins et al. ............... 475/219 |
| 2013/0118159 | A1 | * | 5/2013 | Schultz et al. ................... 60/414 |

* cited by examiner

*Primary Examiner* — Richard Edgar
(74) *Attorney, Agent, or Firm* — James Dottavio; MacMillan, Sobanski & Todd, LLC

(57) ABSTRACT

An automatic transmission pump assembly includes a torque converter housing and pinion that rotate about a first axis, an idler engaged with the pinion, a gear engaged with the idler, shaft secured to the gear, and a pump rotor secured to the shaft and that rotates about a second axis offset from the first axis.

18 Claims, 6 Drawing Sheets

HYDRAULIC PUMP CONFIGURATION FOR AUTOMATIC TRANSMISSION

BACKGROUND OF THE INVENTION

1. Field of the Invention

This invention relates generally to an automatic transmission pump assembly whose axis is parallel to and eccentric of an axis about which an input is driven.

2. Description of the Prior Art

In an automatic transmission for a motor vehicle, an off-axis pump configuration, in which the pump shaft is eccentric from the axis of the power source that drives the pump rotor, offers improved efficiencies as compared to on-axis pumps, in which the power source and pump rotor are axially aligned. However, in a transmission for a rear-wheel-drive application, an off-axis pump usually requires a large bell housing to allow the pump to be part of a front support (called a stator/pump body).

A need exists in the industry for a technique that permits an off-axis pump to be installed from the bottom of the transmission near the valve body. This location facilitates servicing the pump without removing the transmission from the vehicle.

SUMMARY OF THE INVENTION

An automatic transmission pump assembly includes a torque converter housing and pinion that rotate about a first axis, an idler engaged with the pinion, a gear engaged with the idler, shaft secured to the gear, and a pump rotor secured to the shaft and that rotates about a second axis offset from the first axis.

The off-axis pump is installed from the bottom of the transmission, thereby allowing the pump to be serviced without removing the transmission from the vehicle.

By using a drive pinion, idler gear and driven gear, the pump can be mounted from the valve body side allowing a simpler structure for the stator support. Only a simple sheet metal cover is required to seal the front of the transmission from the bell housing.

Installation is simplified by not using a chain to transmit engine torque to the pump rotor.

The off-axis pump can be installed from the bottom of the transmission near the valve body. This location permits servicing the pump without removing the transmission from the vehicle.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
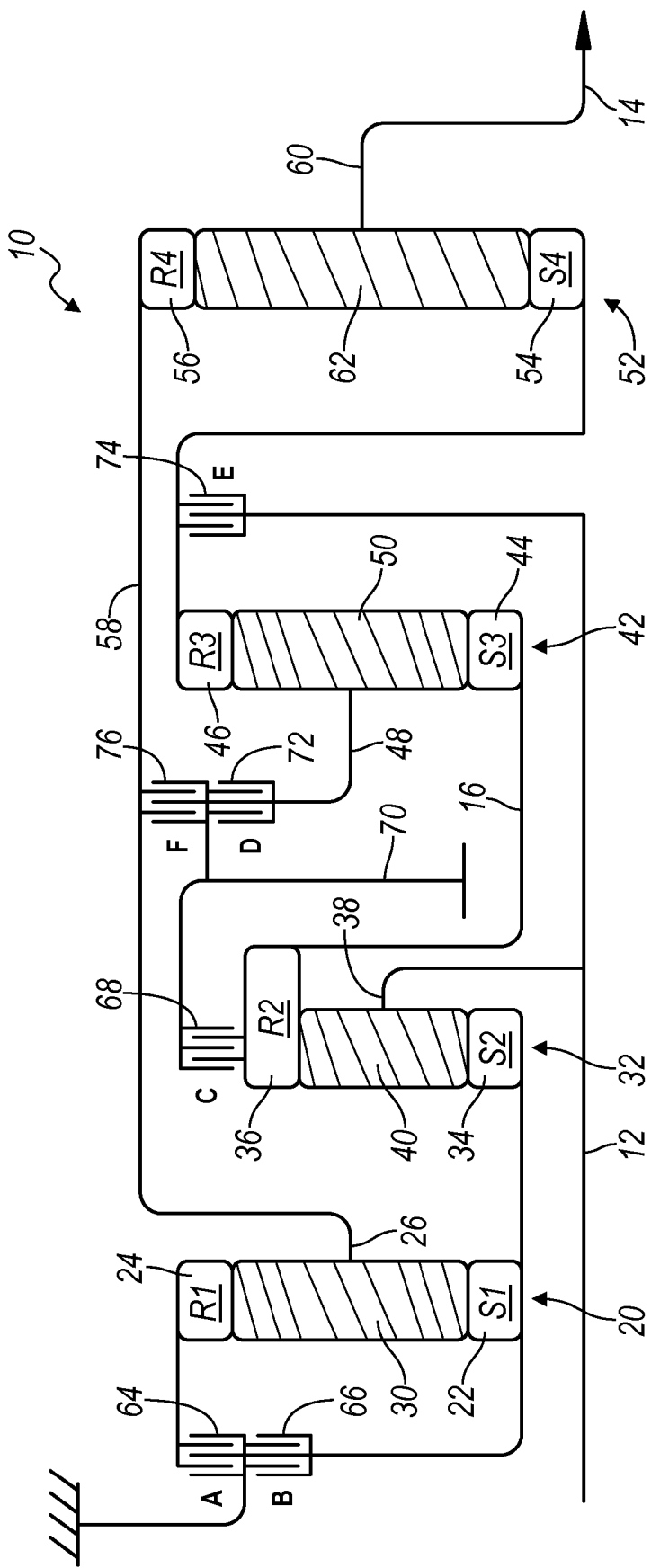
FIG. 1 is a schematic diagram of the kinematic assembly of an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70.

A second clutch 72 selectively couples carrier 48 to clutch housing 70.

A third clutch 74 selectively couples ring gear 46 and sun gear 54 to input 12.

A fourth clutch 76 selectively couples shell 58 to clutch housing 70.

Figure 2:
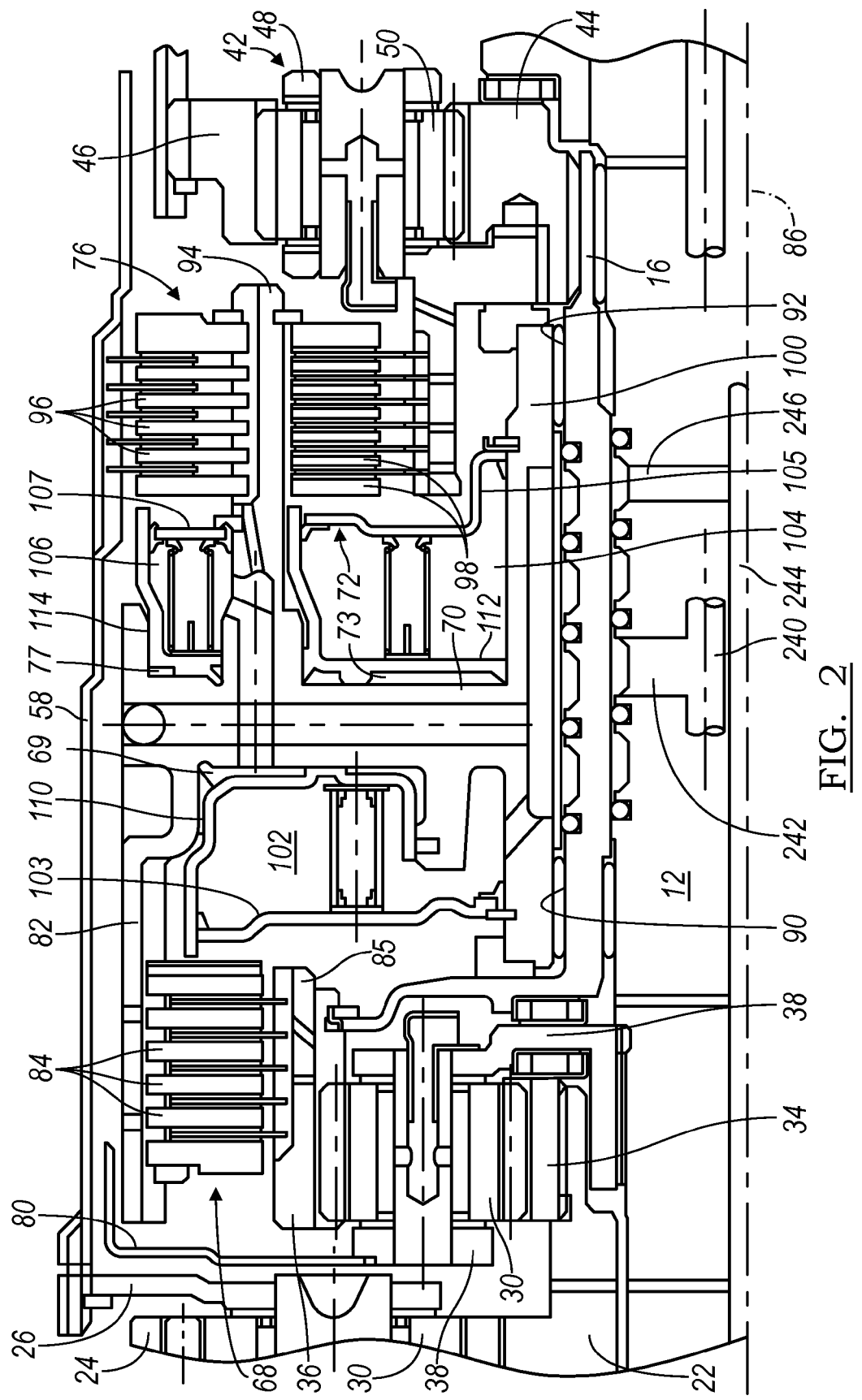
FIG. 2 is a cross sectional side view of an intermediate length portion of the kinematic assembly of FIG. 1 showing a clutch housing.

FIG. 2 shows that carrier 26 is secured to shell 58.

Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 84, which is formed with ring gear 36.

Intermediate shaft 16, which extends along axis 86 on the radial outer side of input 12, is secured to ring 85 where a snap ring 88 completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on a shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance oil feed supplies automatic transmission fluid (ATF) to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits formed in the clutch housing 70. When no actuating pressure is applied to clutches 68, 72, 76, the clutch housing 70 has no fixed connection to any other component of assembly 10.

Figure 3:
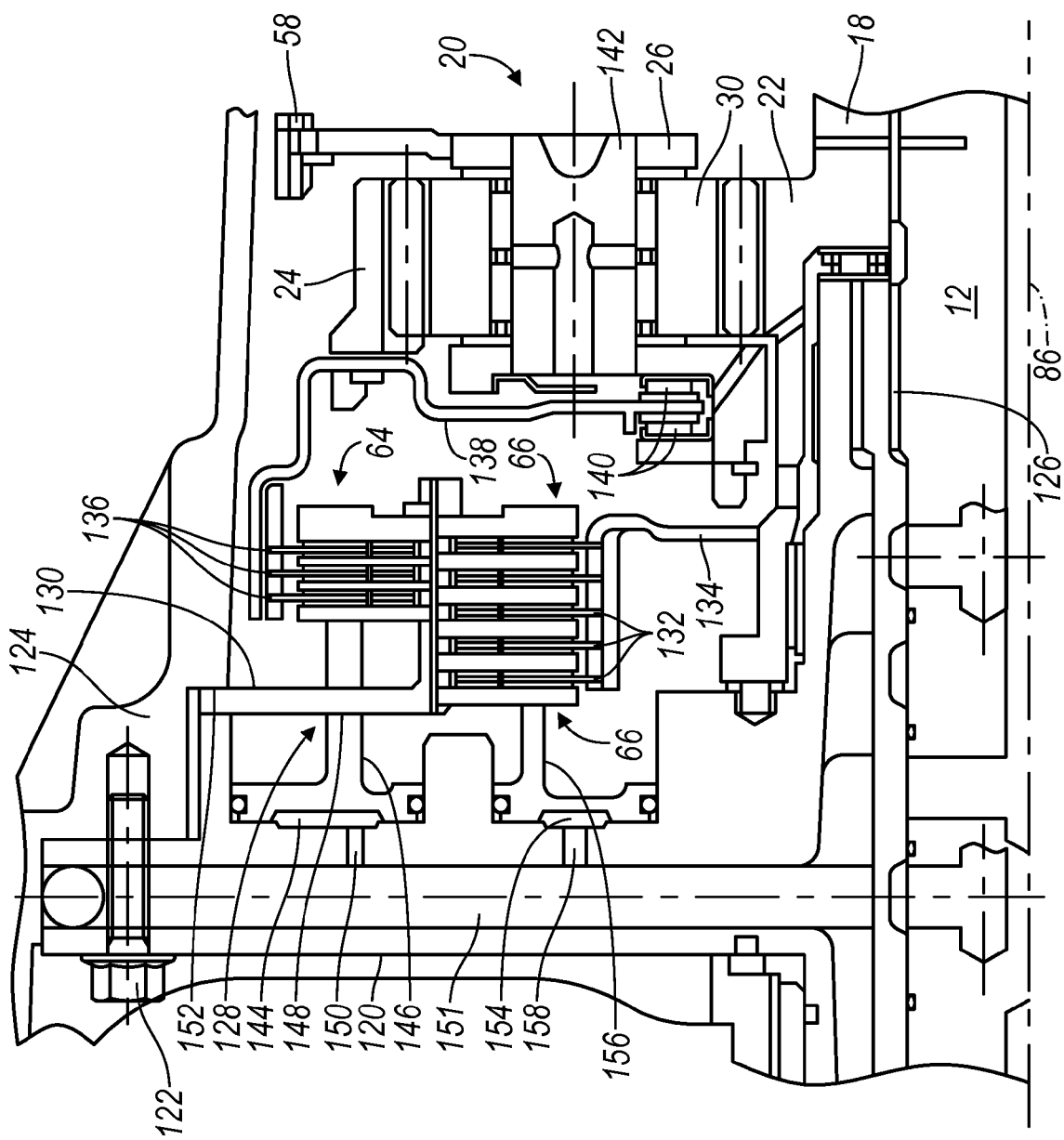
FIG. 3 is a cross sectional side view of a front length portion of the kinematic assembly of FIG. 1 showing a brake assembly.

FIG. 3 shows a pump support 120 secured by bolts 122 to the transmission case 124 and supporting the input shaft 12 on a bushing 126. A hub 128 for brakes 64, 66 includes a radial arm 130, secured to the pump support, and an axial arm formed with external and internal axial splines, to which the spacer plates of the brake and clutch are secured, respectively.

The friction discs 132 of brake 66 are connected to external, axial spline teeth formed on a disc 134, which is secured to the sun gears 22, 34 through intermediate shaft 18. The friction discs 136 of brake 64 are connected to internal, axial spline teeth formed on a disc 138, which is secured to ring gear 24 and is supported between two thrust bearings 140 located on the carrier 26.

The planet pinions 30 of gearset 20 are supported for rotation on a pinion shaft 142, which is supported on carrier 26.

Pump support 120 is formed with a first cylinder 144 containing a piston 146, which extends though openings 148 into contact with one of the spacer plates of brake 64. Brake-apply pressure is carried through passages 150, 151 to cylinder 144. The openings 148 in hub radial arm 130 allow an assembler of the brake hub assembly to see though the arm while aligning friction plates 136 with disc 138.

Pump support 120 is also formed with a second cylinder 154 containing a piston 156, which contacts one of the spacer plates of brake 66. Brake-apply pressure is carried through passage 158 to second cylinder 154.

The radial arm 130 of the brake hub 128 is secured to the transmission case 124 such that the arm contacts an axial stop 152, which limits axial displacement of the arm and provides an axial reaction force to the force of piston 146 applied to the plates of brake 64 and the force of piston 156 applied to the plates of brake 66.

Figure 4:
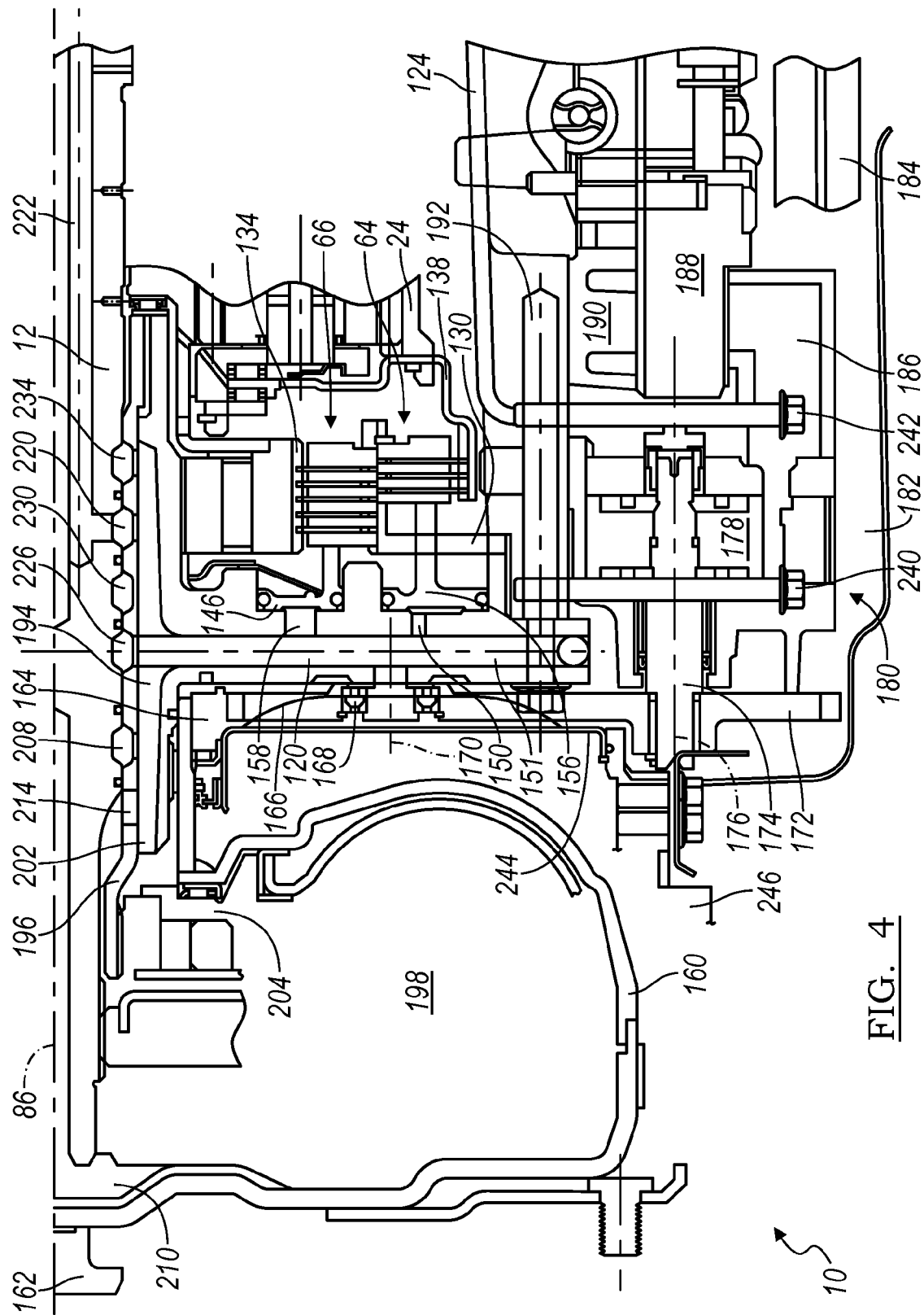
FIG. 4 is a cross sectional side view of a length portion of the kinematic assembly of FIG. 1 showing hydraulic passages.
Figure 5:
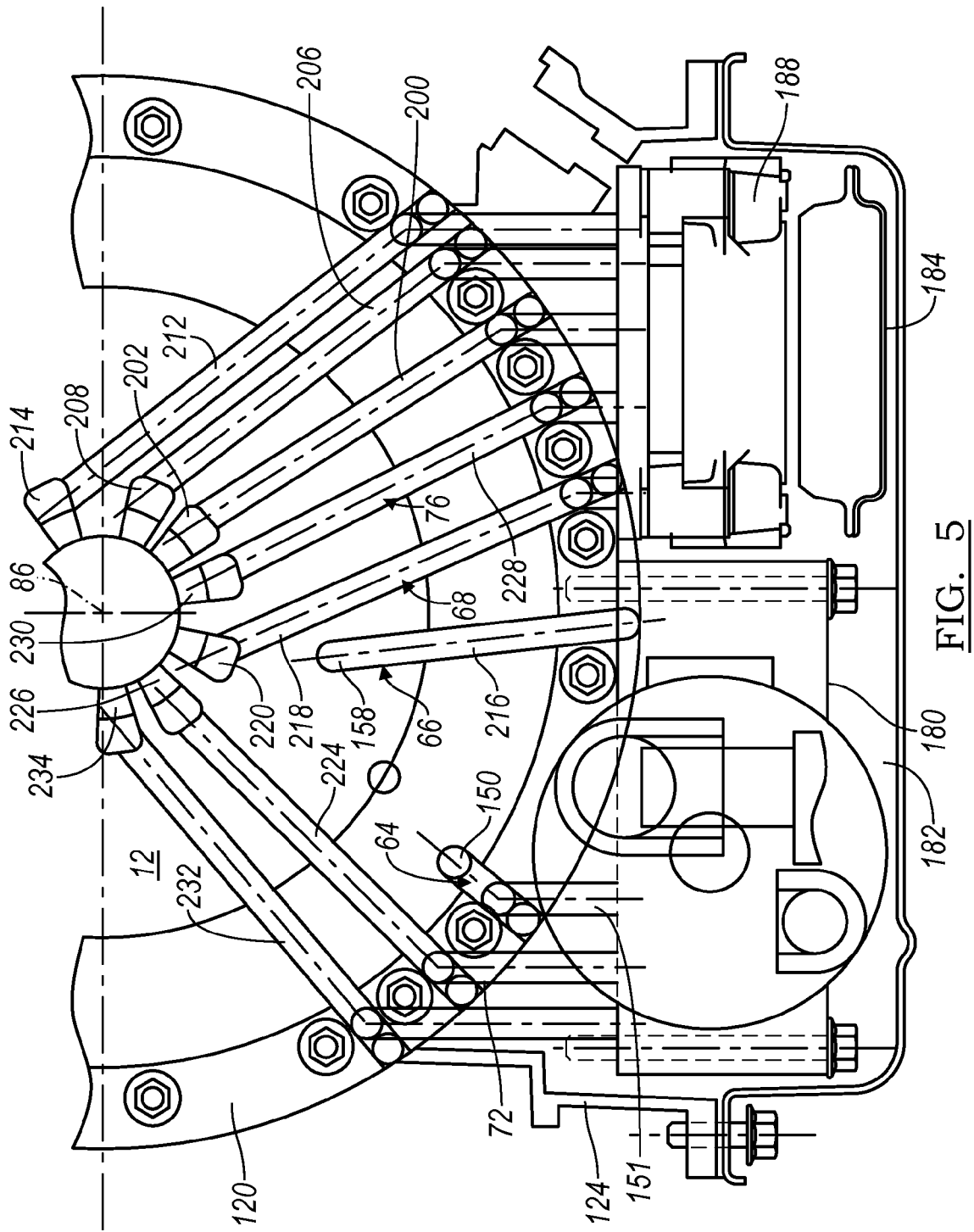
FIG. 5 is a cross sectional end view in the pump support showing hydraulic passages.

FIG. 4 shows a torque converter impeller housing 160, driveably connected to an engine shaft or other power source. A pinion 164 is driveably connected to impeller housing 160. An idler gear 166, supported on a bearing 168 and meshing with the idler, is driven by impeller housing 160 in rotation about the axis of a shaft 170. A gear 172, meshing with idler gear 166, is connected by a spline to a rotor shaft 174, which rotates about axis 176.

The rotor 178 of a variable displacement pump 180, secured to the rotor shaft 174, draws automatic transmission fluid (ATF) into the pump's inlet from an oil sump 182, through a filter 184 located in the sump. ATF exiting the outlet of pump 180 flows sequentially through passage 186, a hydraulic control body 188, a series of oil feed paths 190 and a series of drilled oil feed holes 192. The oil feed holes 192 are formed in transmission case 124.

The pump support 120 is formed with drilled oil feed paths directed toward axis 86 in the pump support 120. Each oil feed path connects one of the drilled oil feed holes 192 with a corresponding oil feed channel 194. Drilled holes in a stator support 196 connect each of the channels 194 to input shaft 12 and to a torque converter 198 located within housing 160.

A pump subassembly that includes pump 180, rotor 178, shaft 174, gear 172, and idler 166 is installed from below the transmission assembly 10 with the idler 166 meshing with gear 172. The subassembly is raised such that idler 166 becomes engaged with pinion 164. Then the pump subassembly is secured to transmission case 124 by bolts 240, 242.

Filter 184 plugs directly into pump 180.

Pump 180 mates directly to the control valve body 188 using a seal to bridge the tolerance gap between the valve body and the pump.

A stamped sheet metal cover 244 is required to seal the front of the transmission assembly 10 from the bell housing 246, which encloses the torque converter 198.

In operation, the vehicle's engine drives the torque converter housing 160, which is driveably connected to pinion 164. Idler 166 is driven by pinion 164, gear 172 is driven by the idler, shaft 174 is driven by the gear, and the pump's rotor 178 is driven by the shaft. The torque converter housing 160 rotates in substantial alignment with axis 86, whereas the pump's rotor rotates about axis 176, which is offset radially with respect to axis 86.

Figure 6:
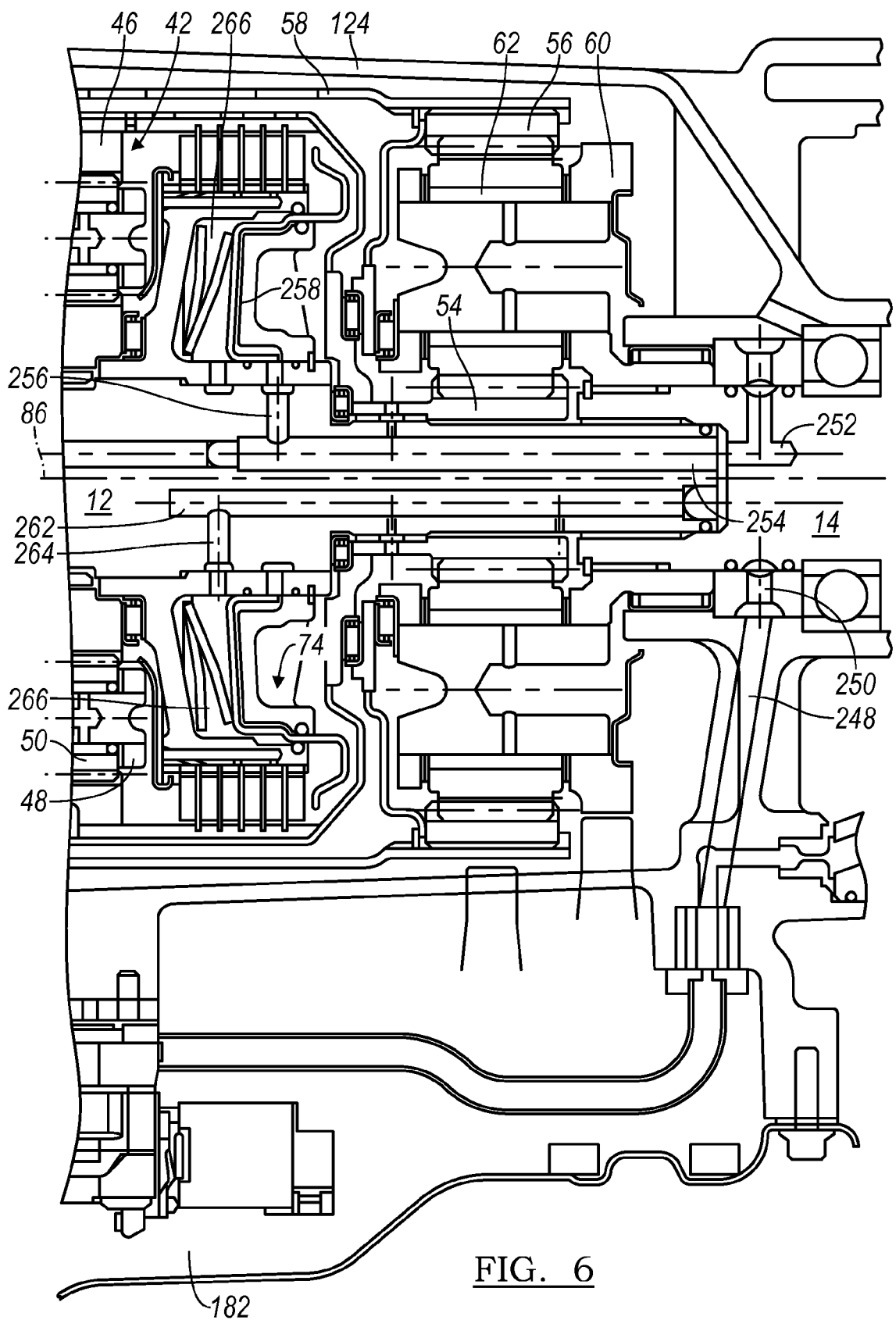
FIG. 6 is a cross sectional side view of a length portion of the kinematic assembly of FIG. 1 showing hydraulic passages that supply the rear clutch.

FIG. 6 is a cross sectional side view of a rearward portion of the kinematic assembly of FIG. 1 showing hydraulic passages that supply lube and clutch-apply pressure to clutch 74. A passage 248 carries fluid from the control body 188, through the oil sump 182 and transmission case 124, to a radial passage 250 formed in the output shaft 14. Aligned and connected axial passages 252, 254 in output shaft 14 and input shaft 12, respectively, hydraulically connect passage 250 and radial passage 256, which carries clutch-apply pressure to the cylinder 258 of the servo that actuates clutch 74.

The same lube passage 262 in input shaft 12 that carries lube to clutches 68, 72, 76 also carries ATF lube to clutch 74 from source of lube in control body 188. Axial passage 262 in input shaft 12 is hydraulically connected to a radial passage 264, which carries lube to the balance volume 266 of clutch 74.

In accordance with the provisions of the patent statutes, the preferred embodiment has been described. However, it should be noted that the alternate embodiments can be practiced otherwise than as specifically illustrated and described.

The invention claimed is:

1. An automatic transmission pump assembly, comprising:
   a torque converter housing and pinion that rotate about a first axis;
   an idler engaged with the pinion;
   a gear engaged with the idler;
   a hydraulic control body;
   a shaft, fixed to the gear, spaced essentially a same distance below the first axis as the body;
   a pump rotor fixed to the shaft, which that rotates about a second axis offset below the first axis.

2. The pump assembly of claim 1, wherein the idler is supported on a second shaft that is secured to a pump support that is secured within transmission case.

3. The pump assembly of claim 2, further comprising a pump cover located at a front side of the pump and secured to a bell housing secured to the transmission case.

4. The pump assembly of claim 3, wherein the pump cover is of sheet metal and closes a forward face of the transmission case.

5. The pump assembly of claim 1, further comprising bolts that secure the pump to a transmission case.

6. The pump assembly of claim 1, wherein the pump is located in a sump secured below a transmission case.

7. The pump assembly of claim 1, wherein the gear, shaft and pump are located in a transmission case in a sump secured to the transmission case.

8. The pump assembly of claim 1 further including:
a transmission case;
a bell housing secured to the transmission case;
wherein the pinion, the idler, the gear shaft and the pump rotor are all located within the transmission case, outside of the bell housing.

9. The pump assembly of claim 1 wherein the shaft is in a transmission case and adjacent to the body.

10. An automatic transmission pump assembly, comprising:
a torque converter housing, rotationally fixed to a pinion, that rotate about a first axis;
an idler engaged with the pinion;
a gear engaged with the idler;
a hydraulic control body;
a shaft, fixed to the gear, that rotates about a second axis offset below the first axis;
a pump rotor fixed to the shaft, the shaft in a transmission case and adjacent to the body.

11. The pump assembly of claim 10, wherein the idler is supported on a second shaft that is secured to a pump support, secured within the transmission case.

12. The pump assembly of claim 11, further comprising a pump cover located at a front side of the pump and secured to a bell housing secured to the transmission case.

13. The pump assembly of claim 12, wherein the pump cover is of sheet metal and closes a forward face of the transmission case.

14. The pump assembly of claim 10, further comprising bolts that secure the pump to the transmission case.

15. The pump assembly of claim 10, wherein the pump is located in a sump secured below the transmission case.

16. The pump assembly of claim 10, wherein the gear, shaft and pump are located in the transmission case in a sump secured to the transmission case.

17. The pump assembly of claim 10 wherein the shaft is spaced essentially a same distance below the first axis as the body.

18. The pump assembly of claim 10 further including:
a bell housing secured to the transmission case;
wherein the pinion, the idler, the gear shaft and the pump rotor are all located within the transmission case, outside of the bell housing.

* * * * *